(No Model.) 5 Sheets—Sheet 4.
A. A. RHEUTAN.
ENVELOPE MACHINE.
No. 385,524. Patented July 3, 1888.
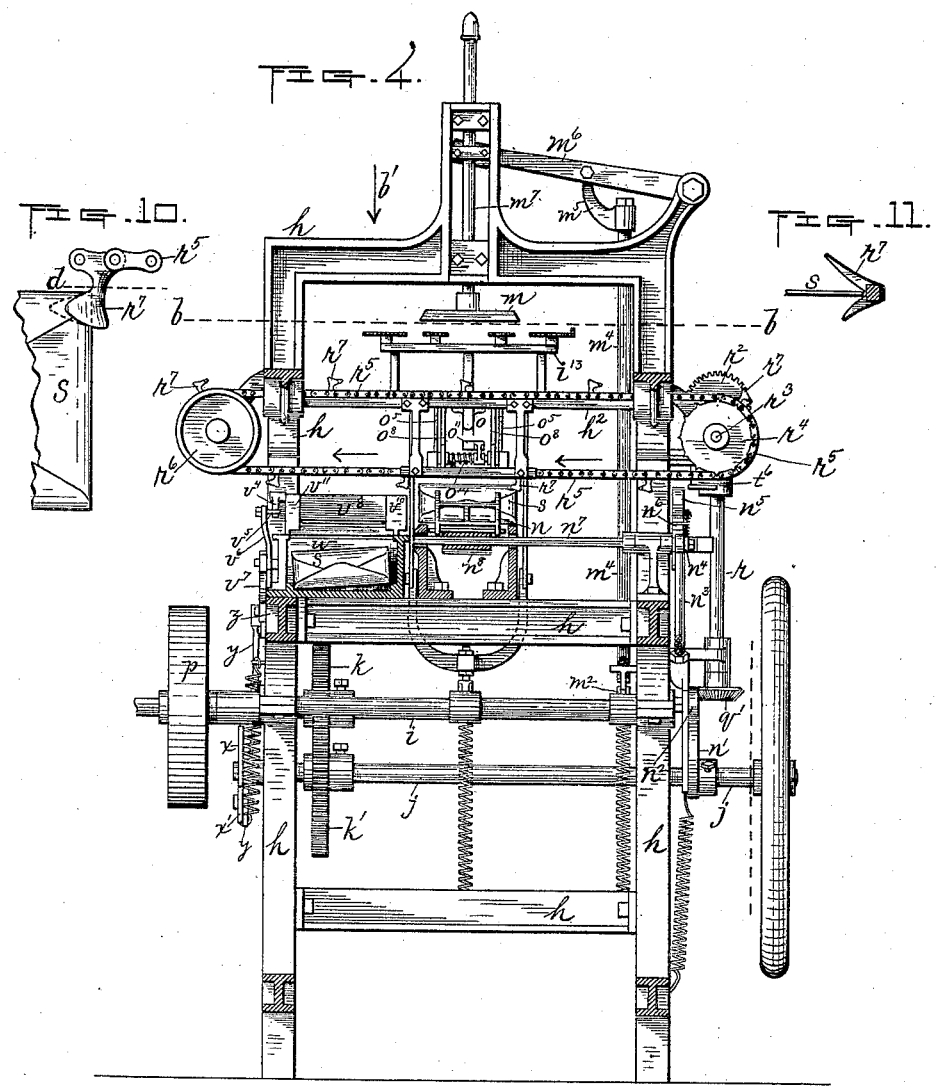

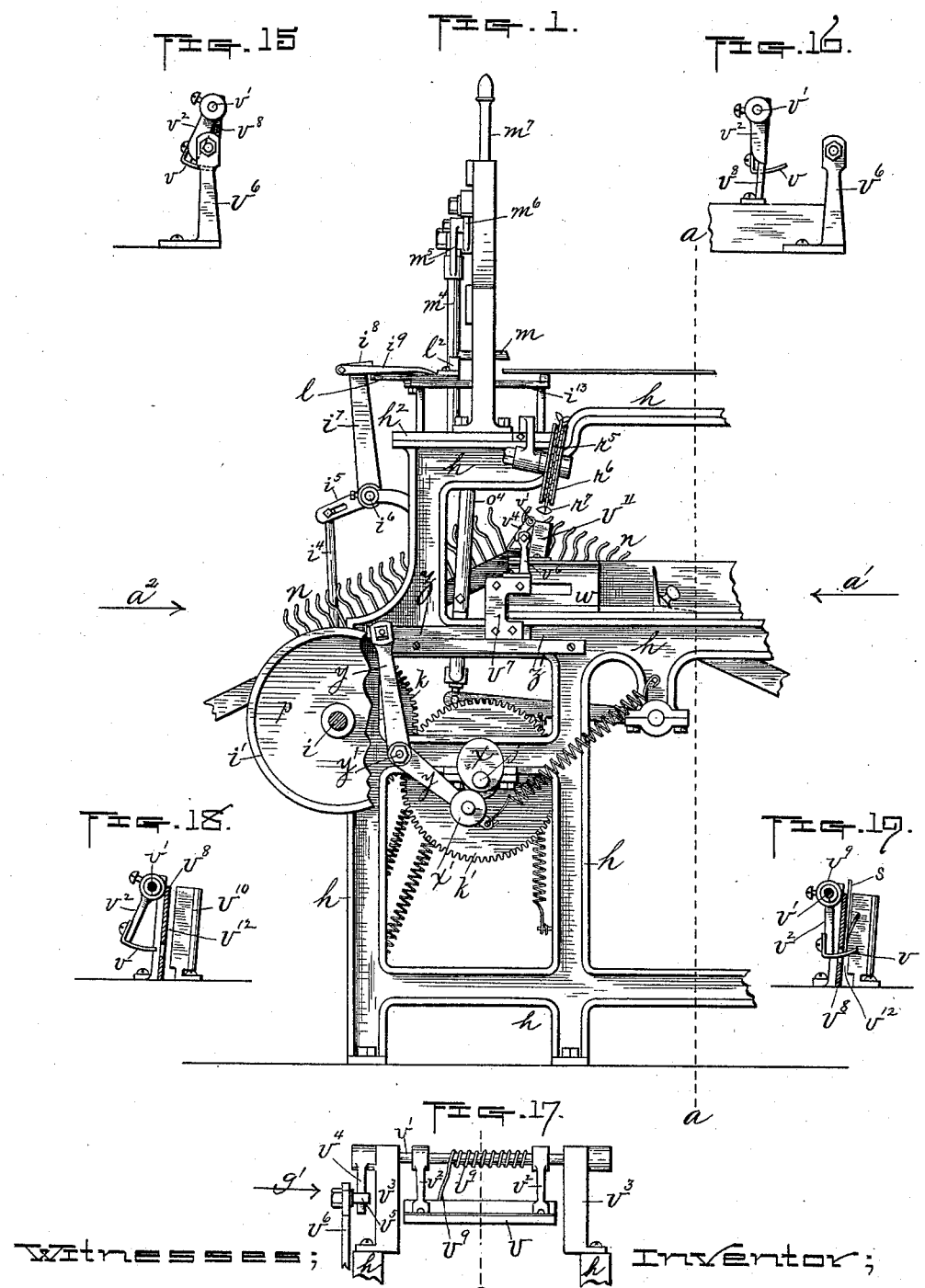

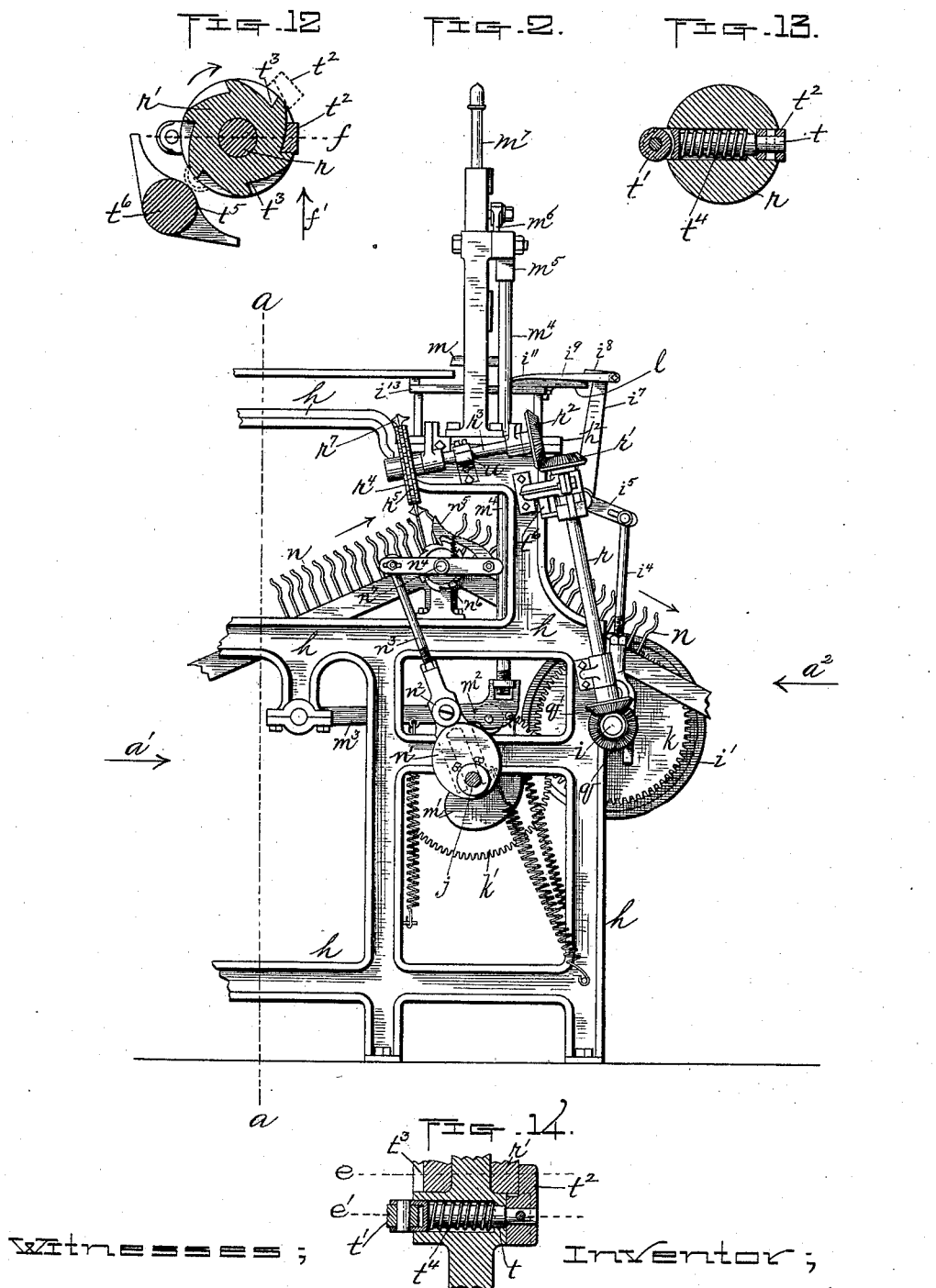

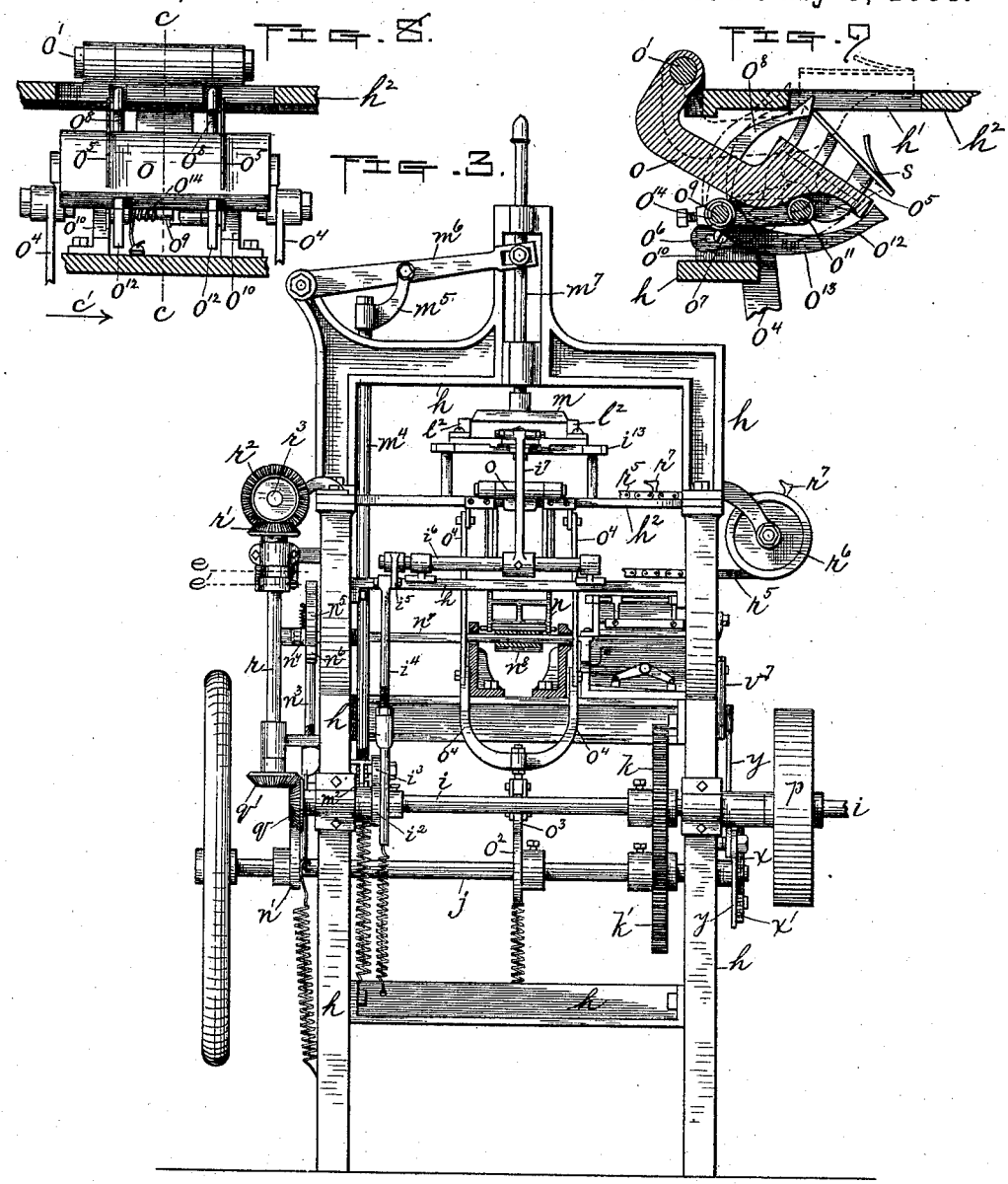

(No Model.)  5 Sheets—Sheet 5.
A. A. RHEUTAN.
ENVELOPE MACHINE.
No. 385,524. Patented July 3, 1888.
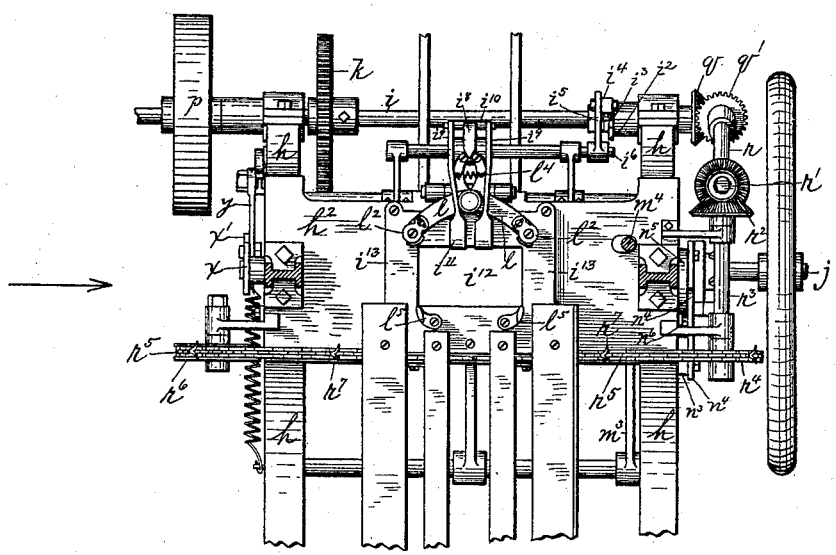
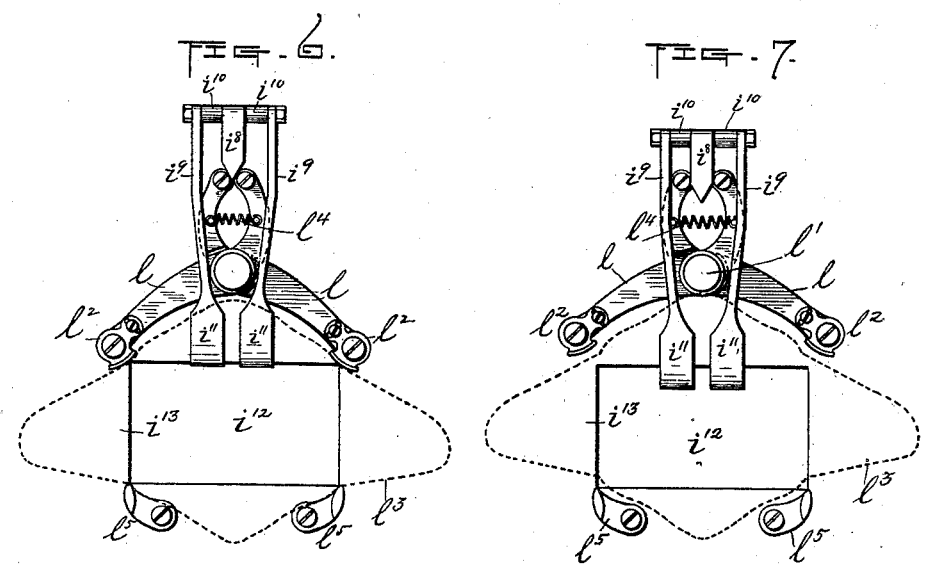

UNITED STATES PATENT OFFICE.

ABRAM A. RHEUTAN, OF WORCESTER, MASSACHUSETTS, ASSIGNOR TO WADE H. HILL, OF SAME PLACE.

ENVELOPE-MACHINE.

SPECIFICATION forming part of Letters Patent No. 385,524, dated July 3, 1888.

Application filed May 11, 1887. Serial No. 237,838. (No model.)

*To all whom it may concern:*

Be it known that I, ABRAM A. RHEUTAN, of Worcester, in the county of Worcester and State of Massachusetts, have invented certain new and useful Improvements in Envelope-Machines; and I do hereby declare that the following is a full, clear, and exact description of the same, reference being had to the accompanying drawings, forming a part of this specification, and in which—

Figure 1 represents a side view of so much of an envelope-machine as is necessary to illustrate my improvements thereon, looking in the direction indicated by the arrow in Fig. 5, said view also showing the main driving-shaft in cross-section, and also a part of the driving-pulley, broken away to show the parts coming back of the same. Fig. 2 is a similar view of the opposite side of the machine, taken in front of the balance-wheel, the shaft of the latter being shown in cross section, as indicated by dotted lines in Fig. 4. Fig. 3 is a rear end view, partly in section, looking in the direction of arrows $a^2$ in Figs. 1 and 2. Fig. 4 is a vertical section taken on lines $a\ a$, Figs. 1 and 2, looking in the direction of arrows $a'$, same figures. Fig. 5 is a horizontal section on line $b\ b$, Fig. 4, looking in the direction of arrow $b'$, same figure. Figs. 6 and 7 are enlarged plan views of adjustable devices, in different positions, employed for guiding and holding the envelope-blanks in position when fed under the plunger. Fig. 8 is a vertical section, taken just in front of the hinged folding-bed, looking toward said folding-bed. Fig. 9 is a vertical section through the parts shown in Fig. 8, taken on line $c\ c$, looking in the direction of arrow $c'$. Fig. 10 is a side view of a portion of the chain and one of its hooks for pushing the envelopes from the drying-chain. Fig. 11 is a horizontal section taken on line $d$, Fig. 10, looking down. Figs. 12 and 13 are horizontal transverse sections through portions of the envelope-discharging mechanism, taken at the points indicated by lines $e$ and $e'$, respectively, in Figs. 3 and 14, looking down. Fig. 14 is a vertical longitudinal section of the same parts of said envelope-discharging mechanism, taken at the point indicated by line $f$, Fig. 12, looking in the direction of arrow $f'$. Figs. 15 and 16 represent side views of the envelope-receiver for catching the envelopes as they are pushed from the drying-chain, and subsequently discharging the same into the counting-box or other receiver, said figures showing the receiver in different positions to more fully illustrate the operation thereof. Fig. 17 is a front side view of said envelope-receiver and its supports; and Figs. 18 and 19 are vertical sections of the receiver shown in similar positions to Figs. 15 and 16, taken on line $g$, Fig. 17, looking in the direction indicated by arrow $g'$, same figure.

My invention relates to improvements in the mechanism for holding the envelope-blanks in position under the plunger preparatory to the latter descending to force said blanks down through the creasing-plate; for facilitating the discharge of the folded envelopes from the hinged folding-bed into the drying-chain; for discharging the envelopes from said drying-chain, and for receiving said envelopes from the drying-chain and discharging the same into the counting-box or other receiver.

Said invention consists in the construction and arrangement of parts as hereinafter more fully set forth to effect the foregoing results.

To enable others to obtain a full and clear understanding of my invention, I will now proceed to give a detailed description thereof with reference to the accompanying drawings.

The various parts marked $h$ represent portions of the main supporting frame-work of the machine.

As my improvements relate only to the rear end of the machine, it is deemed unnecessary to show the whole frame and other parts of said machine which have no relation to my aforesaid improvements. The part $i$ is the main driving-shaft, which is fitted to turn in suitable bearings on frame $h$, and has secured thereon the pulley $i'$. The latter may in turn be driven by means of an endless belt passed around the same and connecting with suitable driving-power, as usual. Power is transmitted from shaft $i$ to another horizontal shaft, $j$, turning in bearings on frame $h$ through spur-gears $k\ k'$, secured on shafts $i\ j$, respectively, and arranged to mesh together.

The blank-holding mechanism previously referred to, as well as the mechanism for pushing the envelopes from the drying-chain, is operated from the shaft $i$, while the mechanisms for operating the plunger, the folding bed, the drying-chain, and the device for receiving the envelopes from the drying-chain into the counting-box or other receiver are actuated from the shaft $j$. Said blank-holding mechanism is constructed and arranged to operate in the following manner: Upon shaft $i$ is secured a cam, $i^2$, which actuates through the roll $i^3$ the connecting-rod $i^4$, said roll being fitted to turn on the lower end of said rod and rolling upon the surface of the cam when the latter is turned. The upper end of connecting-rod $i^4$ is hinged to the outer end of a crank-arm, $i^5$, whose inner end is secured to a horizontal shaft, $i^6$, fitted to turn in suitable bearings on frame $h$. To said shaft $i^6$ is also secured the crank-arm $i^7$, having mounted on its upper end the separating-wedge $i^8$, and envelope-blank guides $i^9 i^9$. The latter are preferably hinged to lateral projections $i^{10} i^{10}$ on each side of the base of said wedge $i^8$, and their inner flattened ends, $i^{11} i^{11}$, which are slightly curved downward, extend over and down into the creasing-plate opening $i^{12}$, when said guides are moved forward, as and for the purpose hereinafter explained.

Upon the creasing-plate $i^{13}$, back of its opening, and upon a central line therewith, are hinged, at $l'$, two arms, $l l$, somewhat resembling in form a pair of shears or tongs. The front ends thereof are provided with adjustable stops or gages $l^2 l^2$ for the envelope-blank $l^3$ (see dotted lines, Figs. 6 and 7) to strike against when pushed forward over the creasing-plate, in the usual way, and their rear ends with a suitable spring, $l^4$, to draw them together, and at the same time allow of their expansion by forcing the wedge $i^8$ in between said rear ends, as and for the purpose also hereinafter described. Said stops $l^2 l^2$ are made adjustable by forming slots therein where their fastening-screws pass through, as shown in Figs. 6 and 7.

In front of the creasing-plate opening $i^{12}$, near the corners thereof, are arranged the usual adjustable stationary guides or stops, $l^5 l^5$.

If desired, the arms $i^9 i^9$ may be dispensed with, and only the arms $l l$ used in connection with the mechanism for opening and closing the same, previously described, said arms $i^9 i^9$ not being essential, but preferably employed upon the machine.

The plunger $m$ of said machine may be operated as usual by means of a cam, $m'$, on shaft $j$, through the cam-roll $m^2$, pivoted lever $m^3$, connecting-rod $m^4$, arm $m^5$, pivoted lever $m^6$, and vertical rod $m^7$, fitted to slide in suitable bearings on frame $h$, the plunger being fastened to the lower end of said vertical rod.

The drying-chain $n$ (only a portion of which is shown in this instance) may also be turned in the usual way by means of a cam, $n'$, on shaft $j$, through the cam-roll $n^2$, connecting-rod $n^3$, pivoted lever $n^4$, pawl $n^5$, ratchet-wheel $n^6$, horizontal shaft $n^7$, and pinion $n^8$, which engages with the under side of the chain, the shaft $n^7$ being fitted to turn in suitable stationary bearings, and the pawl $n^5$ provided with a suitable spring to hold it against the ratchet-wheel.

My improvements in connection with the folding-bed are as follows: Said folding-bed $o$ is hinged at $o'$ to the back side of the creasing-plate $i^{13}$, and is arranged so that its free end will pass up through the opening $h'$ in the main bed $h^2$ when swung forward and up, as shown by dotted lines in Fig. 9. It is operated by means of a cam, $o^2$, on shaft $j$, through the cam-roll $o^3$, and connecting-rods $o^4 o^4$, the upper ends of the latter being hinged to the ends of the bed, as shown in Figs. 3 and 8.

As the envelopes are carried down with the folding-bed by lowering the same, they are received upon the inclined ends of two stationary arms, $o^5 o^5$, which are in this instance fork-shaped, as indicated in Fig. 9. They extend up through slots formed in the folding-bed, and are made adjustable at their fastened ends, so that they may be moved up or down, as occasion requires. In this instance said fastened ends of the arms are each provided with a slot, $o^6$, and set-screw $o^7$, and said slots are made upon a circle with the pivot $o'$ for a center. Therefore when adjusting the same up or down, the same relative position of the arms to the folding-bed is at all times maintained.

The discharge of the envelopes from the inclined ends of arms $o^5 o^5$ is facilitated by means of the arms $o^8 o^8$, secured to the rock-shaft $o^9$ (fitted to turn in bearings $o^{10} o^{10}$) by the upper ends of said arms being moved forward and down from the position shown by dotted lines to that shown by full lines in Fig. 9, said ends striking the edge of each envelope as the folding-bed descends and forcing it forward with a quick motion off of the inclined supports previously described.

The arms $o^8 o^8$ are thus operated by the under side of the folding-bed striking a cam-roll or hub, $o^{11}$, mounted on the outer end of a crank-arm secured to shaft $o^9$. To said shaft $o^9$, in this instance, directly in line with the knocking-off arms $o^8 o^8$, under the latter, are also secured the arms $o^{12} o^{12}$, against the ends of which the under sides of the envelopes strike in passing from the inclined ends of arms $o^5 o^5$, thus preventing them from falling under the folding-bed and insuring their proper delivery into the drying-chain. The arms $o^{12}$ also serve to push down and properly seat the envelopes between the fingers of the drying-chain by the under surfaces $o^{13}$ thereof bearing upon the top edges of said envelopes or they are carried forward under said arms in the operation of the machine.

The employment of the arms $o^8 o^8$ and $o^{12} o^{12}$ for the purposes specified, in connection with the other parts described, constitute the essential features which I desire to cover in the aforesaid folding-bed delivering mechanism.

A constant upward pressure of the cam-roll $o^{11}$ against the under side of the hinged folding-bed $o$ may be produced by means of a spring, $o^{14}$, fastened at one end to shaft $o^9$ and at its other end to frame $h$.

The mechanism for discharging the envelopes from the drying-chain is constructed and arranged to operate in the following manner: Upon the opposite end of shaft $i$ from pulley $p$ is secured a bevel-gear, $q$, which meshes with and turns another bevel-gear, $q'$, on the lower end of shaft $r$, and thence through the bevel-gears $r'\ r^2$, turning the shaft $r^3$, both of said shafts being fitted to turn in suitable bearings on frame $h$. To the opposite end of shaft $r^3$ from bevel-gear $r^2$ is secured a sprocket-wheel, $r^4$, over which is fitted an endless chain, $r^5$, extending around a pulley, $r^6$, upon the opposite side of the machine. Said pulleys and chain, as well as shaft $r$, are preferably arranged at a slight angle to a vertical line, and the shaft $r^3$ at right angles thereto for the purpose of bringing the chain at about right angles to that portion of the drying-chain $n$ over which it travels. Said chain $r^5$ is provided throughout its entire length and at equal distances apart with outwardly-projecting hooks $r^7$, and the chain $r^5$ is arranged at the proper distance above the drying-chain $n$ for the hooks $r^7$ to pass over the outer ends of the fingers of said drying-chain in the direction shown by the arrows in Fig. 4. Therefore as the hooks, which are made in substantially the form shown in Fig. 11, come in contact with the upper back edge of the envelopes $s$, as indicated in Fig. 10, they are pushed forward and discharged laterally from the drying-chain into an adjustable receiver, hereinafter described.

In practice the drying-chain $n$ is moved forward with the usual intermittent motion, the stops being of just sufficient duration to allow each new envelope to be discharged therein, as previously described, before moving on again. It is therefore obvious that the same intermittent motion must be imparted to the chain $r^5$ in order to operate in unison therewith and properly discharge each dried envelope from the drying-chain, and also to allow the envelopes to drop below the hooks $r^7$ after passing by said drying-chain, the chain $r^5$ being stopped just long enough after each hook passes by the drying-chain for the envelope to drop out of said hook into the receiver underneath, previously referred to. It will also be apparent that the aforesaid intermittent motions must be alternately performed; or, in other words, when the drying-chain is stopped the chain $r^5$ must be in motion, or vice versa, to work properly. The chain $r^5$ is given an intermittent motion by means of a locking and unlocking device, combined with the upper end of the inclined shaft $r$, and the hub of the bevel-gear $r'$. Said device consists of a spring-bolt, $t$, fitted in a transverse opening in said shaft, and provided at one end with a friction-roll, $t'$, and at its opposite end with a key, $t^2$, adapted to engage with notches $t^3$ in the hub of the aforesaid bevel-gear $r'$, when allowed to do so, the pressure of the spring $t^4$, fitted over the bolt $t$, exerting a constant draft upon the key to draw it in contact with the notched surface of the hub.

During the operation of the machine the shaft $r$ turns continuously, while the gear $r'$, being fitted to turn thereon, rotates with said shaft only when locked therewith, as above described. Said gear is stopped for an instant at each revolution to allow the drying-chain to be moved forward the distance required to bring each successive dried envelope in line with the discharging-chain $r^5$ by the friction-roll $t'$ striking the cam $t^5$, and causing the key $t^2$ to be forced back beyond its respective notch $t^3$, as shown by dotted lines in Fig. 12, thus removing the driving-power from gear $r'$ until the next notch is reached, and in consequence stopping the same and parts operated thereby. The cam $t^5$ is so arranged and formed in practice that as soon as the key passes over the end of each tooth forming the notches the pressure on the friction-roll $t'$ is released and said key drawn back by its spring, so as to hold against the next notch following, as shown by full lines in said Fig. 12. Said cam is in this instance shown as being formed upon a hub, $t^6$, projecting down from the upper bearing of shaft $r$. (See Figs. 2 and 12.)

Upon the driving-power being removed from bevel-gear $r'$, and parts operated thereby, the momentum thereof may be overcome and their motion arrested by means of a friction-bearing, $u$, fitted to shaft $r^3$ and secured to frame $h$, as shown in Fig. 2. As the envelopes are discharged from the drying-chain they are received upon a plate, $v$, and from there are discharged into the usual counting-box, $w$, in the following manner: Said plate $v$ is suspended from and fastened to a rock-shaft, $v'$, by means of suitable hangers, $v^2\ v^2$, (see Fig. 17,) and said rock-shaft is fitted to turn in suitable stationary bearings, $v^3\ v^3$.

To one end of the rock-shaft is secured a crank-arm, $v^4$, against which a stud, $v^5$, on the upper end of a standard, $v^6$, on sliding carriage $v^7$ strikes, when said carriage is moved back, as hereinafter described. When in its normal position ready to receive an envelope, the plate occupies the position indicated in Figs. 16 and 19, with the forward end thereof inserted through a horizontal slot formed in a stationary vertical plate, $v^8$, being thus held by means of a suitable spring, $v^9$, which exerts a forward pressure against the back side of said plate or its supporting-hangers. The purpose of plate $v^8$ is to prevent the envelopes from being drawn back with the hinged plate $v$, when the latter is moved back from under said envelopes to discharge the same, as hereinafter described. Stationary guard-plates $v^{10}$ $v^{11}$ are also secured in front of plate $v$ to keep the envelopes from falling forward off of said plate $v$. The inner plate, $v^{10}$, is arranged to form a slot, $v^{12}$, between the same and plate $v$, through which the envelopes are inserted in their passage from the drying-chain $n$ to plate $v$. While an envelope is being pushed forward from the drying-chain onto the plate $v$, the carriage $v^7$ is moving back toward said plate, and by the time it has been properly delivered thereon the stud $v^5$ on said carriage has arrived against the crank-arm $v^4$, and swings the plate back through its slot in plate $v^8$, and from under the envelope, thereby discharging the same therefrom into the counting-box, when the motion of the carriage is reversed and said envelope pushed forward and counted, as usual. The plate $v$ serves as a support for the envelope until the discharging-chain $r^5$ stops, as previously stated, when it moves back and allows said envelope to drop out of its hook $r^7$ on said chain $r^5$ into the counting-box, as aforesaid, the chain $r^5$ then moving on again to discharge the next envelope from the drying-chain. Carriage $v^7$ is operated in the ordinary way by means of a cam, $x$, on shaft $j$, through the cam-roll $x'$, crank-arm $y$, hinged at $y'$ to frame $h$, and slide $z$, fitted to work horizontally in a suitable way, $z'$, as is shown in Fig. 1.

As the hinged plate $v$ and method of operating the same in connection with other adjacent parts constitutes the only feature of this part of my improvements, it will be unnecessary to further describe or illustrate the counting mechanism.

Having described my improvements in detail, the operation thereof in connection with such parts of an envelope-machine as relate thereto may be briefly summed up as follows: Assuming that the envelope holding and guiding device shown in Figs. 5, 6, and 7 is in the position shown in Figs. 5 and 6, as the envelope-blank $l^3$ is moved toward the same to deposit it over the opening in the creasing-plate the stops $l^2$ $l^2$ are swung out, as shown in Fig. 7, through the connections with cam $i^2$, as previously described, the same operation also causing the ends $i^{11}$ $i^{11}$ to be moved forward and down toward the opening $i^{12}$. Therefore, as the front edge of the blank passes over said opening it strikes the top sides of the ends $i^{11}$ and is prevented from catching under the edge of the creasing-plate, thus properly depositing it under the plunger, and injury to the front edges of the blank is prevented by swinging out the stops $l^2$, as aforesaid. Upon the blank being deposited the stops are made to swing in again, thereby causing said blank to assume its proper position, as shown in Fig. 6, where it is held until the plunger descends and forces it down into the folder-box. (My improvements relating only to the hinged folding-bed of the folding mechanism, it will be unnecessary to illustrate or describe said mechanism.) After the envelope has been folded in the usual way the folding-bed is swung down with the folded envelope thereon, and the latter is received upon the inclined ends of the stationary arms $o^5$ $o^5$. Said folding-bed, continuing to descend, forces down the arms $o^8$ $o^8$, which strike the back edge of said envelope with a quick blow and force it forward and down from the inclined ends aforesaid into the drying-chain $n$, being guided on its way by the arms $o^{12}$ $o^{12}$, whose under edges also serve to subsequently properly seat said envelope in the chain, as hereinbefore described. As fast as the newly-folded envelopes are discharged into the drying-chain they are carried around by the latter in the usual way, and each preceding envelope that has thus passed around and been dried is discharged from said chain by means of the hooks $r^7$ on the chain $r^6$, which coming in contact with the ends of the envelopes push the latter, one after another, laterally from said chain onto the hinged receiving-plate $v$, the chain $r^5$ and its hooks being properly arranged and operated for the above purpose, as also previously described. Upon each envelope being deposited upon the hinged receiving-plate $v$, the latter is pushed back of the stationary vertical plate $v^8$ and from under said envelope, thereby allowing the same to drop down into the usual counting-box to be pushed forward, counted, and bunched up, as ordinarily.

What I claim as new and of my invention, and desire to secure by Letters Patent, is—

1. A device for stopping and holding the envelope-blanks in position under the plunger of an envelope-machine preparatory to forcing the same through the creasing-plate opening to be folded, consisting of the hinged shear-shaped arms $l$ $l$, having the stops $l^2$ $l^2$ adjustably fastened to their inner ends and provided with a suitable spring for closing their outer ends, a wedge, $i^3$, adapted to enter between said outer ends to open the same, and means connected with said wedge for imparting horizontal reciprocating movements thereto, substantially as shown and specified, for the purpose stated.

2. In an envelope machine, the main bed $h^2$, hinged folding-bed $o$, and bearing $o^{10}$, adapted to receive and hold the shank or base end of the stationary adjustable forked arms $o^5$, in combination with said arms $o^5$, fitted in vertical openings in the folding-bed and provided with inclined or beveled ends upon which to receive the envelopes when they are carried down on said folding-bed, substantially as shown and specified.

3. In an envelope-machine, the combination of the main bed $h^2$ and hinged folding-bed $o$ with the stationary adjustable arms $o^5$, fitted in suitable openings in said folding-bed and provided with inclined or beveled ends upon which to receive the envelopes when they are carried down on the folding-bed, rocking arms $o^8$ $o^{12}$, arranged on shaft $o^9$ and extending respectively above and below the surface of said folding-bed and operated by the latter through a crank-arm and a suitable spring, substantially as and for the purposes set forth.

4. The combination of the driving sprocket-wheel $r^4$ and carrying-pulley $r^6$ with the drying-chain $n$, the endless chain $r^5$, arranged to travel horizontally and laterally through the machine just above said drying-chain, and having hooks $r^7$ projecting out therefrom at intervals around its length adapted to push the envelopes from the drying-chain onto a suitable receiver as the chain $r^5$ is moved forward, substantially as set forth.

5. The endless chain $r^5$, provided with the projecting hooks $r^7$ at intervals around its length and arranged to travel across the path traversed by the drying-chain just above said drying-chain, in combination with means for imparting an intermittent rotary motion to said chain $r^5$ and its hooks, consisting of the pulley $r^6$ and sprocket or toothed wheel $r^4$, over which said chain is fitted, shaft $r^3$, bevel-gears $r^2$ $r'$, shaft $r$, having a locking and unlocking device at its upper end, combined with the hub of said gear $r'$ and with cam $t^5$, as described, bevel-gears $q$ $q'$, shaft $i$, and means for supporting the various parts in position, substantially as and for the purposes set forth.

6. The combination, with the hub of gear $r'$ and continuously-rotating shaft $r$, of spring-bolt $t$ and cam $t^5$, said spring-bolt being fitted in a transverse opening in said shaft and having the friction-roll $t'$ and key $t^2$ at the ends thereof, arranged, respectively, to act against said cam $t^5$ and to engage with the teeth $t^3$, formed on the hub of said gear $r'$, substantially as and for the purpose set forth.

7. The swinging plate $v$, in combination with the stationary upright plate $v^3$ and endless chain $r^5$, said plate $v^8$ having a slot therein to admit of the passage of said plate $v$ in its oscillating movements forward and back to receive and discharge the envelopes as they are delivered from said chain $r^5$, substantially as set forth.

8. The combination of the carriage $v^7$, provided with standard $v^6$ and stud $v^5$, with the crank-arm $v^4$, shaft $v'$, turning in suitable stationary bearings, hangers $v^2$ $v^2$, plate $v$, its spring $v^9$, and stationary plate $v^8$, provided with a horizontal slot to receive plate $v$, substantially as and for the purpose set forth.

9. The combination of the carriage $v^7$, provided with standard $v^6$ and stud $v^5$, with the crank-arm $v^4$, shaft $v'$, turning in suitable stationary bearings, hangers $v^2$ $v^2$, plate $v$, its spring $v^9$, stationary plate $v^8$, provided with a horizontal slot to receive plate $v$, and guide-plates $v^{10}$ $v^{11}$, substantially as and for the purpose set forth.

ABRAM A. RHEUTAN.

Witnesses:
ALBERT A. BARKER,
WALTER B. NOURSE.